United States Patent
Forlenza et al.

(10) Patent No.: US 6,665,375 B1
(45) Date of Patent: Dec. 16, 2003

(54) METHOD AND APPARATUS FOR PROVIDING ACCESSIBILITY TO CALL CONNECTION STATUS

(75) Inventors: Randy Forlenza, Austin, TX (US); Herman Rodriguez, Austin, TX (US); James Newton Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/717,523

(22) Filed: Nov. 21, 2000

(51) Int. Cl.⁷ .............................................. H04M 11/00
(52) U.S. Cl. ...................................... 379/52; 379/93.17
(58) Field of Search ................................ 379/52, 93.17, 379/93.23, 110.01, 100.06, 142.01, 142.16, 257, 376.01

(56) References Cited

U.S. PATENT DOCUMENTS

| | | | | |
|---|---|---|---|---|
| 4,544,808 A | | 10/1985 | Milne et al. ............ 179/99 LS |
| 4,727,567 A | | 2/1988 | Angelini ..................... 379/52 |
| 4,924,493 A | | 5/1990 | Dang et al. ................. 379/94 |
| 5,533,110 A | | 7/1996 | Pinard et al. ............... 379/201 |
| 5,570,420 A | * | 10/1996 | Bress et al. ................. 379/220 |
| 5,615,257 A | * | 3/1997 | Pezzullo et al. ............ 379/96 |
| 5,710,806 A | | 1/1998 | Lee et al. .................... 379/96 |
| 5,805,677 A | * | 9/1998 | Ferry et al. ............. 379/93.23 |
| 5,835,581 A | | 11/1998 | Wu et al. ................... 379/142 |
| RE36,228 E | | 6/1999 | Joffe et al. ................. 379/257 |
| 5,909,481 A | | 6/1999 | Hasselgren et al. ........... 379/27 |
| 5,953,650 A | | 9/1999 | Villevieille ................ 455/404 |
| 6,002,749 A | | 12/1999 | Hansen et al. ............... 379/52 |
| 6,047,173 A | | 4/2000 | Leyen et al. ................ 455/404 |
| 6,055,445 A | * | 4/2000 | Hiroki ....................... 379/396 |
| 6,104,909 A | | 8/2000 | Baldwin et al. ............. 455/5.1 |
| 6,292,548 B1 | * | 9/2001 | Jreij et al. ................ 379/93.23 |
| 6,389,124 B1 | * | 5/2002 | Schnarel et al. .......... 379/93.23 |

OTHER PUBLICATIONS

IBM Technical Disclosure Bulletin, *Computer–Telephone Software Interface*, vol. 33, No. 4, Sep. 1990, pp. 149–150.
IBM Technical Disclosure Bulletin, *Telephone Call Progress Detection Method*, vol. 28, No. 5, Oct. 1985, pp. 1864–1865.
IBM Technical Disclosure Bulletin, *Intelligent Telephone*, vol. 23, No. 9, Feb. 1981, pp. 4006–4008.
IBM Technical Disclosure Bulletin, *Voice Communication System for Data Network*, vol. 21, No. 6, Nov. 1978, pp. 2546–2547.

* cited by examiner

*Primary Examiner*—Stella Woo
(74) *Attorney, Agent, or Firm*—Duke W. Yee; Jeffrey S. LaBaw; Stephen R. Tkacs (57) ABSTRACT

A telephone device is customized with an indicator for presenting call connection status information to hearing impaired or deaf users. The telephone device detects call status events, such as ringing and busy signals, and presents the call status via the display. The telephone device also receives codes indicating particular call status events. A telephone device may generate a code, which indicates that the user is hearing impaired. Thus, devices receiving this code may perform particular functions in response to such a code. Public switches and public branch exchanges may also be modified to generate and deliver call status codes or messages. The present invention may also deliver call status information through another medium, such as a computer network.

21 Claims, 7 Drawing Sheets

METHOD AND APPARATUS FOR PROVIDING ACCESSIBILITY TO CALL CONNECTION STATUS

BACKGROUND OF THE INVENTION

1. Technical Field

The present invention relates to a telephone assistance device. More particularly, the present invention provides a method and apparatus for providing call connection status information to callers with hearing impairment.

2. Description of Related Art

Persons with hearing impairment face many obstacles in daily life. Routine tasks that people without hearing impairment take for granted may be difficult or impossible for people with hearing impairment. One such task is the use of a telephone. Many hearing impaired people speak very well and may find the use of a telephone useful. For example, a traveler may wish to call home to tell a spouse or loved one that he or she has arrived safely. When a worker is held up in traffic, the worker may wish to call the office to notify a superior that he or she will be late.

Assuming that a person with hearing impairment wishes to speak using a telephone, several barriers exist that prevent the hearing impaired person from using a telephone. One such barrier is that a hearing impaired caller cannot hear information, such as a dial tone, ringing, busy signal, or answering machine. Therefore, the caller must dial the number and repeat a spoken message several times hoping that the intended recipient answered and heard the message. The caller has no knowledge of the call connection status. Thus, a caller may accidentally call a facsimile machine and speak a message while the facsimile machine attempts to negotiate a facsimile transmission. Such a situation may call attention to the impairment, resulting in frustration and embarrassment.

Therefore, it would be advantageous to provide a method and apparatus for providing feedback on call connection status.

SUMMARY OF THE INVENTION

The present invention solves the disadvantages of the prior art by providing a telephone with a customized display for displaying call connection status information. The telephone detects call status events, such as ringing and busy signals, and presents the call status via a status indicator. The telephone also receives codes indicating particular call status events, such as "on hold" and "voice mail record mode." The present invention also provides telephones and other devices, such as answering machines and interactive voice response systems that generate call status codes or messages. A telephone may generate a code, which indicates that the user is hearing impaired. Thus, devices receiving this code may perform particular functions in response to such a code. For example, if an answering machine receives a code indicating that the caller is hearing impaired, the answering machine may skip the message, transmit a "recording" call status code, and record the caller's message. Public switches and public branch exchanges may also be modified to generate and deliver call status codes or messages. The present invention may also deliver call status information through another medium, such as a computer network. Thus, a caller may view call status information on a computer screen while attempting a telephone call.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
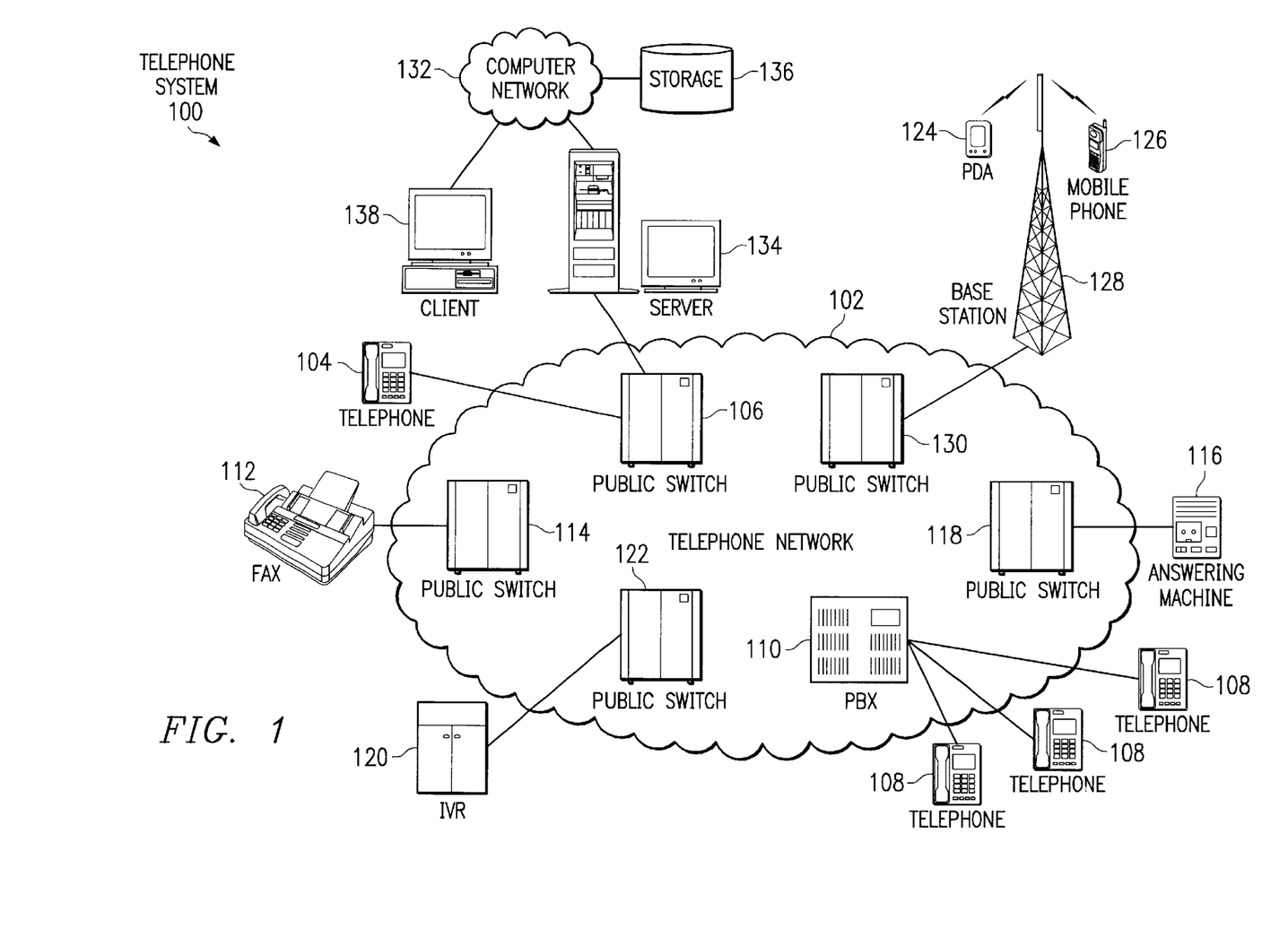
FIG. 1 depicts a pictorial representation of a telephone system in which the present invention may be implemented.

With reference now to the figures, FIG. 1 depicts a pictorial representation of a telephone system in which the present invention may be implemented. Telephone system 100 is a network of telephone devices and computers in which the present invention may be implemented. Telephone system 100 contains a telephone network 102, which is the medium to provide telephonic communications between various telephone devices connected together in telephone system 100. Telephone network 102 may include connections, such as wire, wireless communications links, or fiber optic cables.

In the depicted example, a telephone 104 is connected to telephone network 102 via public switch 106. A public switch is a large-scale computer system that is used to switch telephone calls, which are comprised of analog or digital data streams. Switches used to connect customers to the telephone networks are known as end office switches. End office switches may be connected together within a telephone network through tandem switches, which do not deal directly with the customers.

Telephones 108 are connected to the telephone network via public branch exchange (PBX) 110. A PBX is an in-house telephone switching system that interconnects telephone extensions to each other, as well as to an outside telephone network, such as telephone network 102. A PBX may include functions such as least cost routing for outside calls, call forwarding, conference calling and call accounting. Modern PBXs use all-digital methods for switching and may support both digital terminals and telephones along with analog telephones. Telephones 108 may also be configured in a business environment with a voice mail system (not shown). PBX 110 may be connected to the telephone network by a public switch (not shown).

Fax machine 112 may be connected to the telephone network by public switch 114 and answering machine 116 may be connected to the telephone network by public switch 118. Furthermore, interactive voice response (IVR) system 120 may be connected to the telephone network by public switch 122. An IVR system is an automated telephone answering system that responds with a voice menu and allows the user to make choices and enter information via the keypad or spoken input. IVR systems are widely used in call centers as well as a replacement for human switchboard operators. The system may also integrate database access and fax response. IVR system 120 may be used to answer telephone calls at a store or business, provide business information, such as hours of operation and directions, and to direct calls to intended recipients or a voice mail system. Alternatively, IVR system 120 may be connected to the telephone network through a PBX, such as PBX 110.

Personal digital assistant (PDA) 124 and mobile telephone 126 may communicate with telephone network 102 using wireless technology. PDA 124 and mobile telephone 126 communicate with base station radio tower 128. The base station connects the caller with the telephone network through public switch 130. Base station 128 may cover a small geographic area referred to as a cell. A cellular telephone system includes many base stations, each covering a cell that only slightly overlaps adjacent cells at the borders. Therefore, the present invention may include many such base stations and public switches to serve a large geographic area if base station 128 is part of a cellular system. The PDA and mobile telephone may communicate with the base station through various means, such as satellite communications, analog and digital cellular communications, and radio frequency transmission.

A person of ordinary skill in the art will recognize that the configuration of telephone system 100 shown by example in FIG. 1 will vary depending upon implementation. For example, telephone system 100 may include any number of public switches and public branch exchanges connected to telephone network 102, each connected to any combination of telephones, answering machines, facsimile machines, IVR systems, and other telephone devices known in the art.

In accordance with a preferred embodiment of the present invention, a hearing impaired person may initiate a telephone call using a telephone device, such as telephone 104, one of telephones 108, or wireless telephone 126. For example, a person with hearing impairment may attempt to leave a spoken message for a recipient at a telephone device connected to telephone network 102 using telephone 104. Telephone 104 may be configured to detect and display call connection status information during the call. The caller enters the number using a keypad and, while the number is dialed, the telephone displays call status information, such as "Dialing." Next, telephone 104 detects that the recipient's telephone is ringing and displays call status information, such as "Ringing." If the recipient answers the telephone, the caller's telephone displays call status information, such as "Answered by: Person." Finally, when the recipient hangs up, telephone 104 detects this call status event and displays call status information, such as "Disconnected."

A call status event may be any detectable event which may change call status. For example, when the recipient's telephone is off hook, the public switch through which the recipient's telephone is connected to the telephone network generates a "busy" call status event. This call status event is then communicated to the caller's telephone, which presents the call status event using a "busy signal." However, call status events in the prior art are typically communicated using audible information, which is not useful to a hearing impaired caller. Prior art modems and facsimile machines may detect audio information on the telephone line, such as ringing and busy signals. However, this technique is limited and does not allow telephone devices to report their own call status on the telephone line.

According to a preferred embodiment of the present invention, a telephone device may be configured to detect audible call status information and convert the information into visual call status information, such as a text message or graphical representation. Also, telephone devices within telephone network 102 and connected to telephone network 102 that generate call status events may be configured to generate a code or message representing the call status event. The code or message may be a binary code, which may be modulated and transmitted through the telephone network. A set of binary codes may be established to universally represent call status information. For example, an eight-bit code may be used to represent up to 256 call status events. Thus, a telephone device may be configured to demodulate the signal, identify a call status code, and determine a visual representation for display using, for example, a lookup table.

Call status codes may also be reserved for specific devices. For example, a facsimile machine may generate one code, while a computer modem generates a different code. Furthermore, an answering machine or voice mail system may generate a first code when the call is answered, a second code when the outgoing message is playing, and a third code when the machine is recording. Still further, a telephone device may generate a code when initiating a call. Therefore, a hearing impaired person may be presented with call status information, such as "Calling: Facsimile Machine," when receiving a telephone call.

Figure 2A:
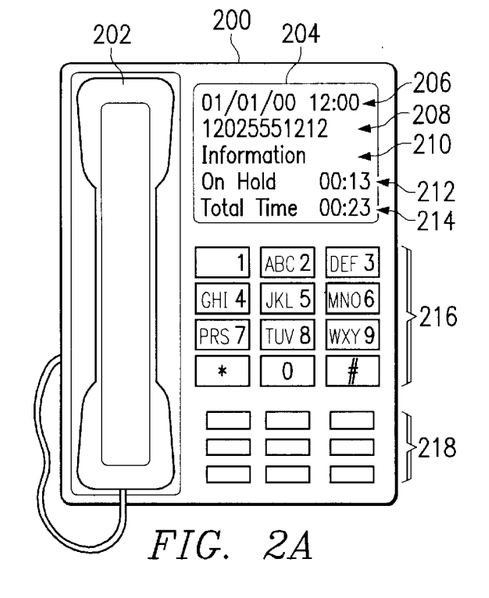
FIGS. 2A, 2B, and 2C are exemplary telephone devices are shown illustrating call status information display in accordance with a preferred embodiment of the present invention.
Figure 2B:
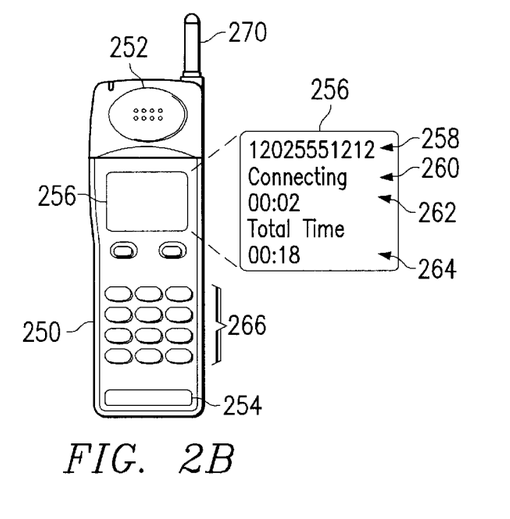
Figure 2C:
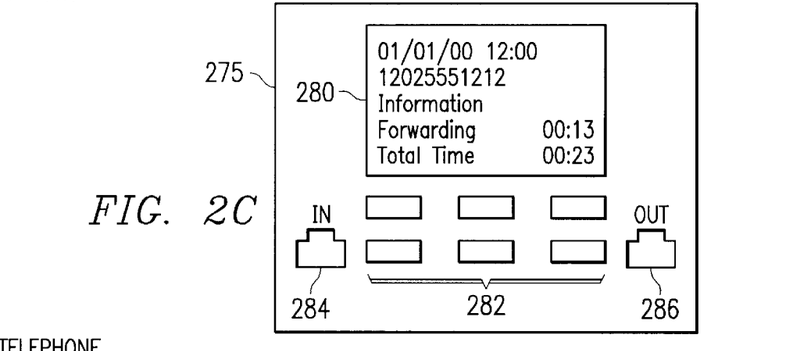

With reference now to FIGS. 2A, 2B, and 2C, exemplary telephone devices are shown illustrating call status information display in accordance with a preferred embodiment of the present invention. Particularly, with reference to FIG. 2A, telephone 200 includes handset 202, display 204, and keypad 216. A caller may make a telephone call in a known manner using handset 202 and keypad 216.

According to a preferred embodiment of the present invention, display 204 shows visual information to assist a hearing impaired caller. For example, display 204 may display a date and time 206, telephone number called 208, text description of the party called 210, call status and amount of time in present call status 212, and total time of call 214. In the example shown in FIG. 2A, the date and time may be kept by an internal clock or by the telephone system, such as a PBX. The text description of the party called may be retrieved from an internal number storage for speed dialing or from caller identification (ID) information, as known in the art. In addition to or in place of display 204, telephone 200 may include other indicator means, such as light emitting diodes (LED) or a vibrating mechanism (not shown).

Telephone 200 may also include function keys or buttons 218. The function keys may be used to perform known telephone functions, such as redialing a number, placing a call on hold, forwarding a call, transferring a call, and placing a call on speakerphone. According to a preferred embodiment of the present invention, telephone 200 may generate a call status code in response to each of these functions. Furthermore, buttons 218 may be configured to perform additional functions, such as generating a code that indicates that the caller is hearing impaired. Alternatively, telephone 200 may be programmed to generate a code that indicates that the caller is hearing impaired whenever a call is initiated using telephone 200. Turning now to FIG. 2B, a mobile telephone 250 is shown in accordance with a preferred embodiment of the present invention. Mobile telephone 250 includes speaker 252, microphone 254, display 256, and keypad 266. Display 256 may display the telephone number called 258, call status information 260, amount of time in present call status 262, and total time of call 264. Mobile telephone 250 also includes antenna 270 for communication with the nearest base station. Mobile telephone 250 may include other features common to mobile telephones, such as function buttons, cursor control buttons, scroll wheels, and caller ID.

Turning now to FIG. 2C, a call status monitoring device 275 similar to a caller ID box is shown in accordance with a preferred embodiment of the present invention. Call status monitoring device 275 includes display 280, function buttons 282, input jack 284, and output jack 286. A telephone cord may be plugged into input jack 284, connecting the caller ID device to the telephone line. A telephone may be connected to the caller ID device through output jack 286. Alternatively, the call status monitoring device may be connected to the telephone line using wireless technology, such as Bluetooth technology. Bluetooth is a wireless personal area network (PAN) technology from the Bluetooth Special Interest Group founded by Ericsson, IBM, Intel, Nokia and Toshiba. Bluetooth is an open standard for short-range transmission of digital voice and data between mobile devices, such as laptops, PDA devices, and phones, and desktop devices. It supports point-to-point and multi-point applications.

Caller status monitoring device 275 may operate in a manner similar to prior art caller ID devices. However, according to a preferred embodiment of the present invention, display 280 may display call status information and time in present call status, as discussed above with respect to display 204 in FIG. 2A and display 256 in FIG. 2B. Buttons 282 may be configured to provide an interface for managing caller ID entries or generating call status codes.

In an alternative embodiment, call status monitoring device 275 may be incorporated into other known devices. For example, the call status monitoring device may be incorporated into a cable television or satellite television receiver. Some cable television and satellite television receivers require a telephone connection to upload or download programming information. Thus, the call status monitoring device may be incorporated into a television receiver and display call status information on a television.

Figure 3:
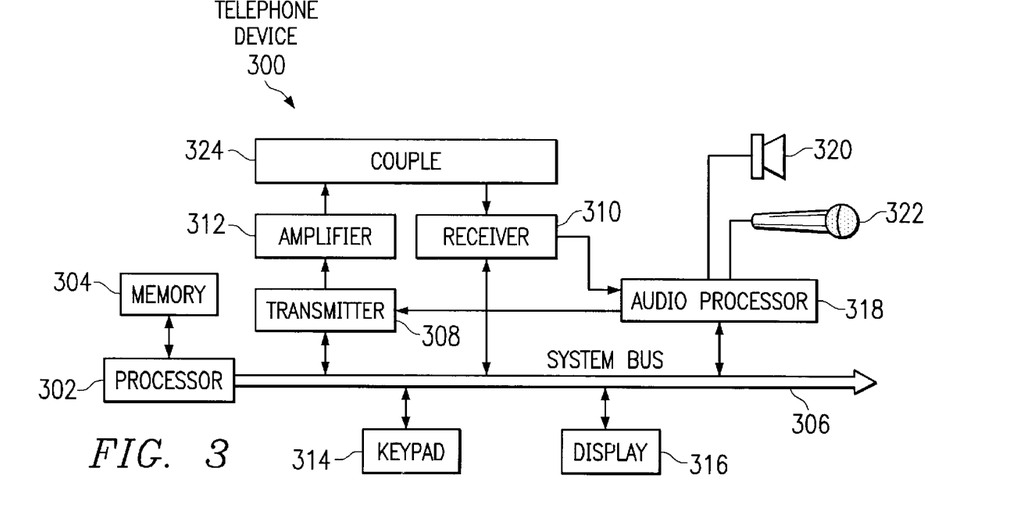
FIG. 3 is a block diagram of a hardware configuration of a telephone device in accordance with a preferred embodiment of the present invention.

With reference now to FIG. 3, a block diagram of a hardware configuration of a telephone device is depicted in accordance with a preferred embodiment of the present invention. Telephone device 300 includes a processor 302 for controlling operation of the telephone device and a memory 304. The processor may be a general-purpose microprocessor operating under the control of instructions stored a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be keypad 216 or buttons 218 in FIG. 2A, keypad 268 in FIG. 2B, or buttons 282 in FIG. 2C. Display 316 may be display 204 in FIG. 2A, display 256 in FIG. 2B, or display 280 in FIG. 2C. Display 316 may be a liquid crystal display (LCD) or other known displays, such as a cathode ray tube or active matrix display.

Transmitter 308 and receiver 310 are coupled to a telephone signal by couple 324 to provide full duplex communication. The telephone signal may be provided by a telephone line (not shown) in a land-based telephone or an antenna, such as antenna 270 in FIG. 2B, in a wireless telephone. Audio processing circuit 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316.

Those of ordinary skill in the art will appreciate that the hardware depicted in FIG. 3 may vary. For example, if telephone device 300 is a caller ID device, speaker 320 and microphone 322 may be excluded. Furthermore, other call status indicators may be included in addition to or in place of display 316. For example, telephone device 300 may include a vibrating mechanism to indicate call status with a vibration pattern. Telephone device 300 may also include a graphics adapter to present call status information on a television or computer monitor. Display 316 may also comprise one or more LED's to present call status information.

Returning to FIG. 1, telephone system 100 contains a computer network 132, which is the medium used to provide communications links between various devices and computers connected together within a network of data processing systems. Network 132 may include connections, such as wire, wireless communication links, or fiber optic cables.

In the depicted example, a server 134 is connected to network 132 along with storage unit 136. In addition, client 138 also is connected to network 132. This client 138 may be, for example, a personal computer or network computer. In the depicted example, server 134 provides data, such as boot files, operating system images, and applications to client 138. Server 134 services client 138. The network of data processing systems may, include additional servers, clients, and other devices not shown. In the depicted example, the network is the Internet with network 132 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network also may be implemented as a number of different types of networks, such as for example, an intranet, a local area network (LAN), or a wide area network (WAN). FIG. 1 is intended as an example, and not as an architectural limitation for the present invention.

Public switch 106 is connected to server 134, which may be located at the end office. When public switch 106 generates or receives a call status code, the public switch transmits the call status code to server 134 to be saved in a storage, such as storage 136. The call status code may be saved in association with each party involved in the telephone call. A telephone number or other identification may identify the parties involved in the telephone call. Each party may have its own account or allocated storage. The server may save the call status codes or may translate each code into a call status message. The client program may also translate call status codes into messages using a lookup table.

A caller may use client 138 to retrieve call status codes or messages from server 134. Client 138 may include a client program, which polls server 134 at frequent intervals to receive call status information in substantially real time. The client program may be programmed with the identity of the caller to retrieve the appropriate call status information. For example, telephone 104 and client 138 may be located at a caller's residence. When a hearing impaired caller attempts a telephone call with telephone 104, switch 106 generates and receives call status codes and transmits these codes to server 134. Client 138 polls server 134 and retrieves call status codes from the server and displays them in apparently real time. Thus, telephone 104 need not be modified to enable call status presentation. Alternatively, client 138 may register with server 134 and the server may deliver call status messages directly to the client.

A caller may also use client 138 to initiate or receive a telephone call using network or Internet telephony technology, as known in the art. Client 138 may be used to initiate a telephone call through telephone network 102 with the recipient using a conventional telephone, such as one of telephones 108. Further, a person may receive a telephone call at client 138, the telephone call originating at a conventional telephone. Still further, a call may be made between client 138 and a second client computer (not shown). In the latter example, computer network 132 may serve as a telephone network without using telephone network 102.

Figure 4:
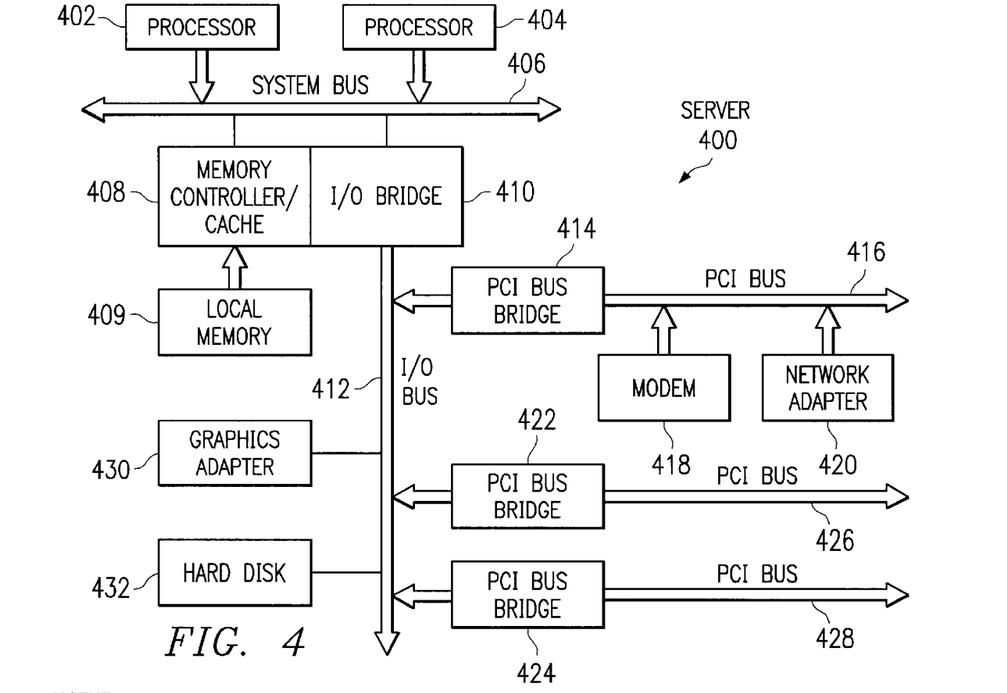
FIG. 4 is a block diagram of a data processing system that may be implemented as a server in accordance with a preferred embodiment of the present invention.

Referring now to FIG. 4, a block diagram of a data processing system that may be implemented as a server, such as server 134 in FIG. 1, is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI bus 416. Typical PCI bus implementations will support four PCI expansion slots or add-in connectors. Communications links to a network computers, such as client 138 in FIG. 1 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM RISC/System 6000 system, a product of International Business Machines Corporation in Armonk, N.Y., running the Advanced Interactive Executive (AIX) operating system.

Figure 5:
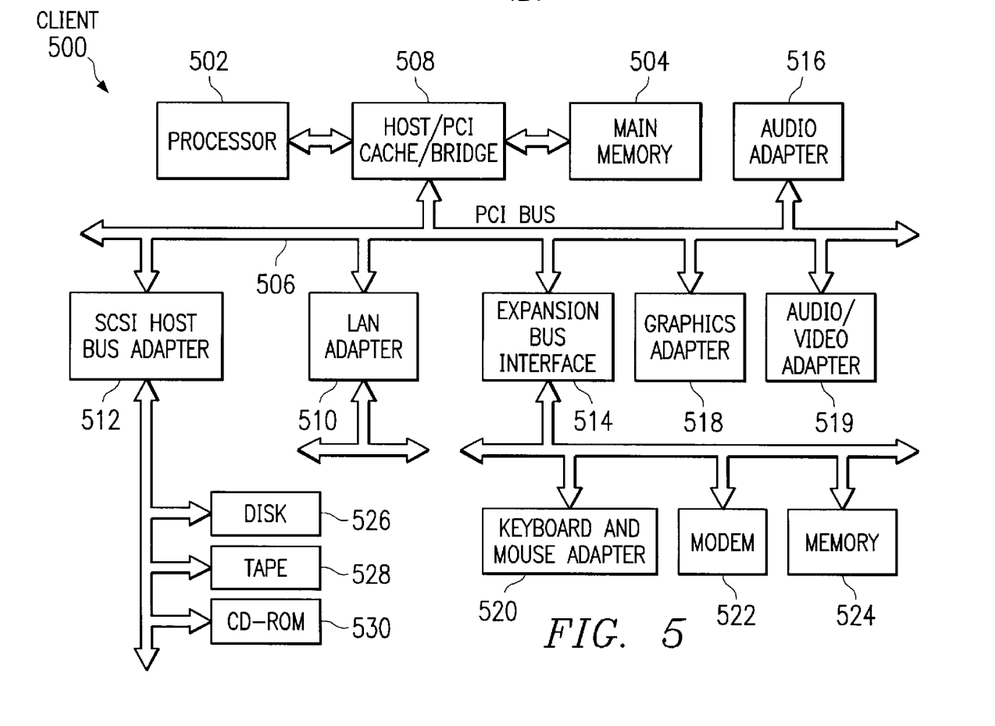
FIG. 5 is a block diagram illustrating a data processing system in which the present invention may be implemented.

With reference now to FIG. 5, a block diagram illustrating a data processing system is depicted in which the present invention may be implemented. Data processing system 500 is an example of a client computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, small computer system interface (SCSI) host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows 2000™, which is available from Microsoft Corporation. An object oriented programming system such as Java™ may run in conjunction with the operating system and provide calls to the operating system from Java programs or applications executing on data processing system 500. Instructions for the operating system, the object-oriented programming system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interface, whether or not data processing system 500 comprises some type of network communication interface. As a further example, data processing system 500 may be a Personal Digital Assistant (PDA) device, which is configured with ROM and/or flash ROM in order to provide nonvolatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

Figure 6:
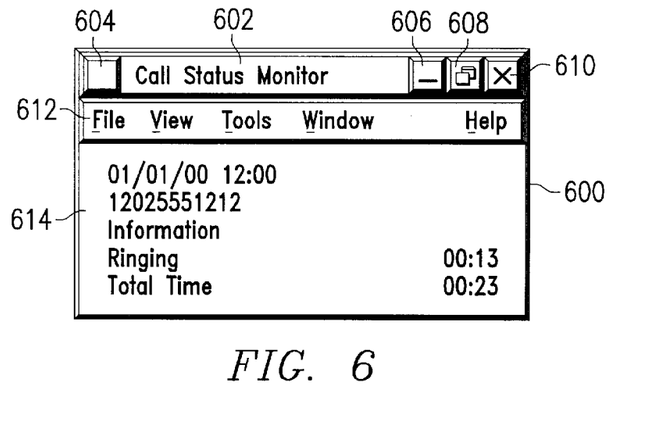
FIG. 6 is an example screen of display of a call status client program in accordance with a preferred embodiment of the present invention.

With reference now to FIG. 6, an example screen of display of a call status client program is illustrated in accordance with a preferred embodiment of the present invention. The screen comprises call status monitor window 600, including title bar 602, which may display the name of the application program. Title bar 602 also includes a control box 604, which produces a drop-down menu (not shown) when selected with the mouse, and "minimize" 606, "maximize" or "restore" 608, and "close" 610 buttons. The "minimize" and "maximize" or "restore" buttons 606 and 608 determine the manner in which the program window is displayed. In this example, the "close" button 610 produces an "exit" command when selected. The drop-down menu produced by selecting control box 604 includes commands corresponding to "minimize," "maximize" or "restore," and "close" buttons, as well as "move" and "resize" commands.

The call status monitor application may be initiated when a call is initiated or received. For example, a modem may monitor the status of the telephone line and open the call status monitor application when a significant status is detected. A terminate and stay ready (TSR) program may run in the background and open call status monitor window upon detection of a significant call status event. The call status monitor window may be closed when a call ends, such as when the telephone is in a on-hook status.

Call status monitor window 600 also includes a menu bar 612. Menus to be selected from menu bar 612 include "File", "View", "Tools", "Window", and "Help." However, menu bar 612 may include fewer or more menus, as understood by a person of ordinary skill in the art. Window 600 provides a graphical user interface (GUI) through which the user may perform functions. For example, through the "View" menu, the user may view past call status events in the current call. The user may also use the "Tools" menu to manage a log of past calls.

The call status monitor window display area 614 may display date and time information, number dialed or number from which call is received, identity of party called or calling, call connection status and time in present call status, and total time of call. Display 614 may present status information in a manner similar to display 204 in FIG. 2A, display 256 in FIG. 2B, or display 280 in FIG. 2C.

Figure 7:
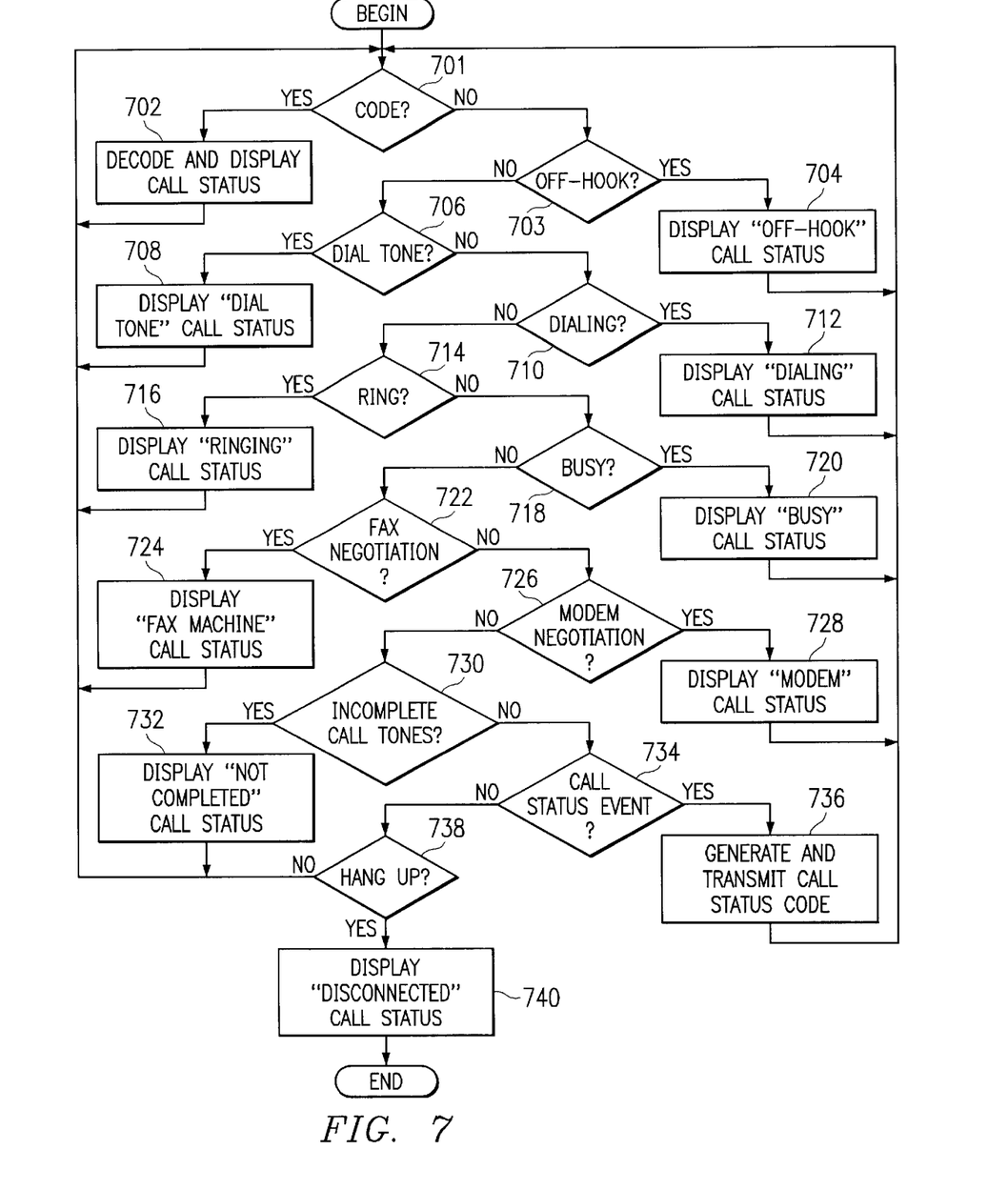
FIG. 7 is a flowchart illustrating the operation of a call status enabled telephone device in accordance with a preferred embodiment of the present invention.

With reference now to FIG. 7, a flowchart illustrating the operation of a call status enabled telephone device is shown in accordance with a preferred embodiment of the present invention. The process begins and a determination is made as to whether a call status code is received (step 701). If a call status code is received, the process decodes the call status code, displays the call status (step 702), and returns to step 701 to determine if another code is received. Alternatively, if the device is enabled to perform a service in response to a code, the process may perform the service in step 702. For example, if the telephone device is an enabled answering machine and the code indicates that the caller is hearing impaired, the answering machine may skip the outgoing message in step 702.

If a call status code is not received in step 701, a determination is made as to whether an off-hook event is detected (step 703). If an off-hook event is detected, the process displays an "Off-Hook" call status (step 704) and returns to step 701 to determine if a code is received.

If an off-hook event is not detected in step 703, a determination is made as to whether a dial tone is detected (step 706). If a dial tone is detected, the process displays a "Dial Tone" call status (step 708) and returns to step 701 to determine if a code is received. If a dial tone is not detected in step 706, a determination is made as to whether the telephone device is dialing (step 710). If the telephone device is dialing, the process displays a "Dialing" call status (step 712) and returns to step 701 to determine if a code is received.

If the telephone device is not dialing in step 710, a determination is made as to whether a ringing signal is detected (step 714). If an audible ringing signal is detected, the process displays a "Ringing" call status (step 716) and returns to step 701 to determine if a code is received. If a ringing signal is not detected in step 714, a determination is made as to whether an audible busy signal is detected (step 718). If a busy signal is detected, the process displays a "Busy" call status (step 720) and returns to step 701 to determine if a code is received.

If an audible busy signal is not detected in step 718, a determination is made as to whether an audible facsimile negotiation is detected (step 722). If a facsimile negotiation is detected, the process displays a "Fax Machine" call status (step 724) and returns to step 701 to determine if a code is received. If an audible facsimile negotiation is not detected in step 722, a determination is made as to whether a modem negotiation is detected (step 726). If an audible modem negotiation is detected, the process displays a "Modem" call status (step 728) and returns to step 701 to determine if a code is received.

If a modem negotiation is not detected in step 726, a determination is made as to whether a message that the call cannot be completed as dialed is received (step 730). Typically, when a call cannot be completed as dialed, an audible message will be presented to the caller preceded by a series of beeps or tones. Thus, the telephone device may detect the tones and identify the message. If a message that the call cannot be completed as dialed is received, the process displays a "Not Completed" call status message (step 732) and returns to step 701 to determine if a code is received.

If an audible message that the call cannot be completed as dialed is not received in step 730, a determination is made as to whether a call status event is initiated by the user's telephone device. For example, the caller may press a button to put the call on hold. The caller may also press a button to indicate that the caller is hearing impaired. If a call status event is initiated by the telephone device, the process generates and transmits a call status code (step 736) and returns to step 701 to determine if a code is received.

If a call status event is not initiated by the telephone device in step 734, a determination is made as to whether the hearing impaired caller hangs up (step 738). If the caller does not hang up, the process returns to step 701 to determine if a code is received. If the caller does hang up in step 738, the process displays a "Disconnected" call status (step 740) and ends.

Figure 8A:
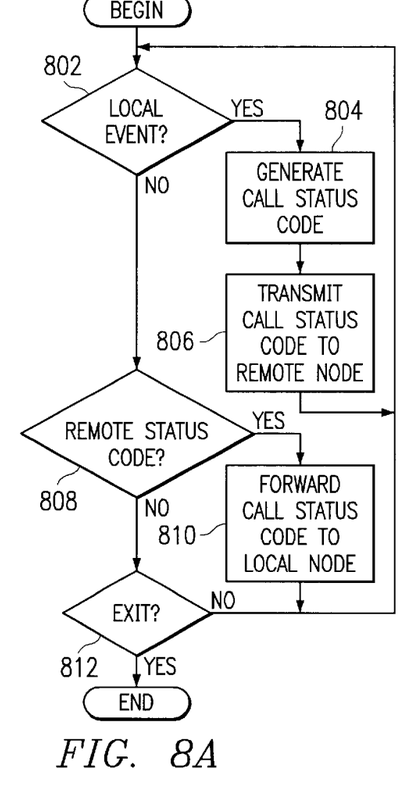
FIGS. 8A and 8B are flowcharts illustrating the operation of a telephone device that connects an end user's node with a telephone network to generate a call status event in accordance with a preferred embodiment of the present invention.
Figure 8B:
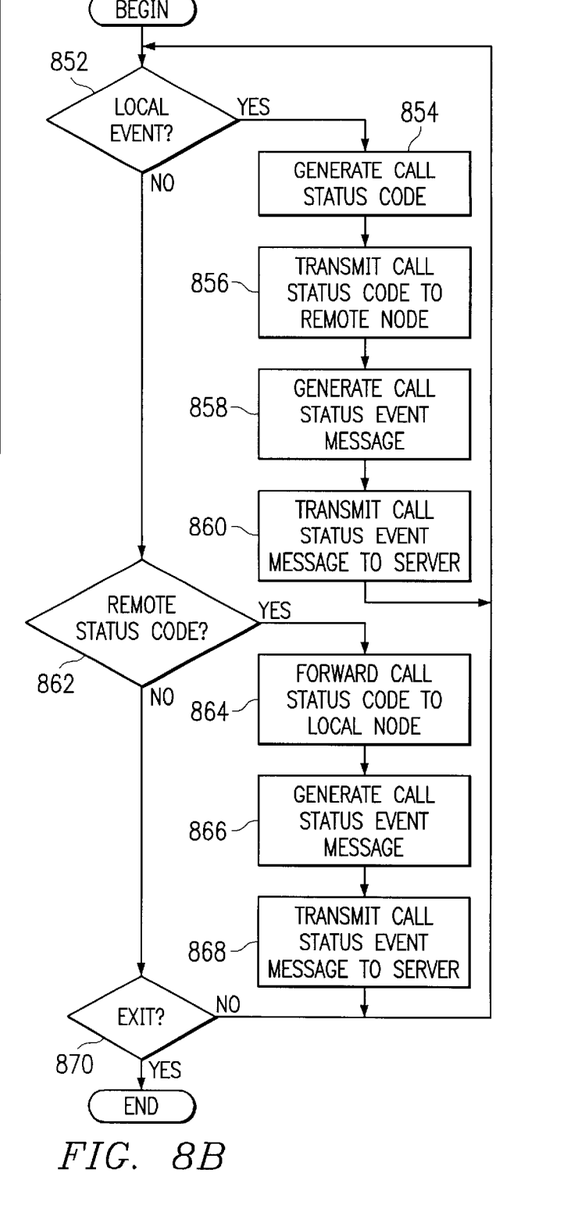

With reference now to FIGS. 8A and 8B, flowcharts are shown illustrating the operation of a telephone device that connects an end user's node with a telephone network to generate a call status event in accordance with a preferred embodiment of the present invention. In the processes depicted in FIGS. 8A and 8B, a telephone device may be a public switch or a public branch exchange, such as switches 106, 114, 118, public branch exchanges 110, 130, or base station 128 in FIG. 1.

Particularly, with reference to FIG. 8A, the process begins and a determination is made as to whether a local event is generated (step 802). If a local event is generated, the process generates a call status code (step 804), transmits the call status code to the remote node (step 806), and returns to step 802 to determine whether a local event is generated.

If a local event is not generated in step 802, a determination is made as to whether a remote status code is received (step 808) from a remote node, such as a public switch associated with the recipient's telephone device or the recipient's telephone device itself. If a remote status code is received, the process forwards the call status code to the local node (step 810) and returns to step 802 to determine whether a local event is generated.

If a remote call status code is not received in step 808, a determination is made as to whether an exit condition is detected (step 812). An exit condition may be that the telephone device is shut down or otherwise made inactive. If an exit condition is not detected, the process returns to step 802 to determine whether a local event is generated. If an exit condition is detected in step 812, the process ends.

With reference now to FIG. 8B, a flowchart illustrating the operation of a telephone device that connects a hearing impaired user's node with a telephone network and communicates call status codes to a server on a computer network is shown in accordance with a preferred embodiment of the present invention. The process begins and a determination is made as to whether a local event is generated (step 852). If a local event is generated, the process generates a call status code (step 854), transmits the call status code to the remote node (step 856), generates a call status event message (step 858), transmits the call status event message to the server (step 860), and returns to step 852 to determine whether a local event is generated. A call status event message may include the call status code and an associated identification of the local call participant. For example, the status event message may include the call status code and the telephone number of the local call participant. Alternatively, the call status event message may include an identification of every party involved in the telephone call.

If a local event is not generated in step 852, a determination is made as to whether a remote status code is received (step 862) from a remote node, such as a public switch associated with the recipient's telephone device or the recipient's telephone device itself. If a remote status code is received, the process forwards the call status code to the local node (step 864), generates a call status event message (step 866), transmits the call status event message to the server (step 868), and returns to step 852 to determine whether a local event is generated.

If a remote call status code is not received in step 862, a determination is made as to whether an exit condition is detected (step 870). An exit condition may be that the telephone device is shut down or otherwise made inactive. If an exit condition is not detected, the process returns to step 852 to determine whether a local event is generated. If an exit condition is detected in step 870, the process ends.

Figure 9:
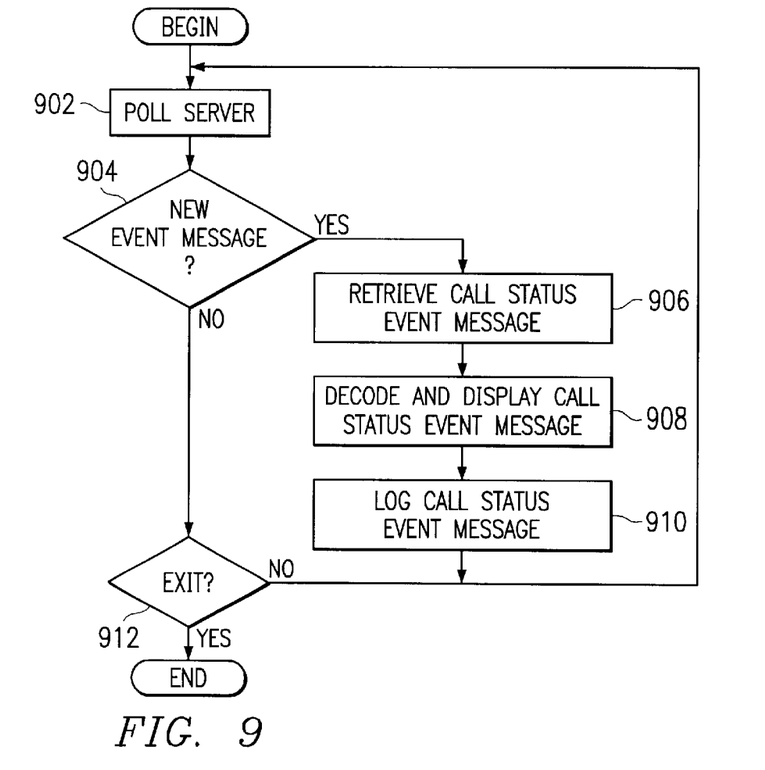
FIG. 9 is a flowchart illustrating the operation of a client call status monitoring program in accordance with a preferred embodiment of the present invention.

With reference now to FIG. 9, a flowchart illustrating the operation of a client call status monitoring program is shown in accordance with a preferred embodiment of the present invention. The process begins and polls the server (step 902). Then, a determination is made as to whether a new event message is located on the sever (step 904). If a new event message exists, the process retrieves the call status event message (step 906), decodes and displays the call status event message (step 908), logs the call status event message (step 910), and returns to step 902 to poll the server. The call status monitoring program logs call status event messages in local storage, such as disk 526 in FIG. 5. Thus, the user may view missed call status events or manage a log of past calls.

If a new event message is not found on the server in step 904, a determination is made as to whether an exit condition is detected (step 912). An exit condition may be an exit command issued through the GUI in window 600 in FIG. 6. For example, the user may issue an exit command by clicking on "Close" button 610. If an exit condition is not detected, the process returns to step 902 to poll the server. If an exit condition is detected in step 912, the process ends.

Figure 10:
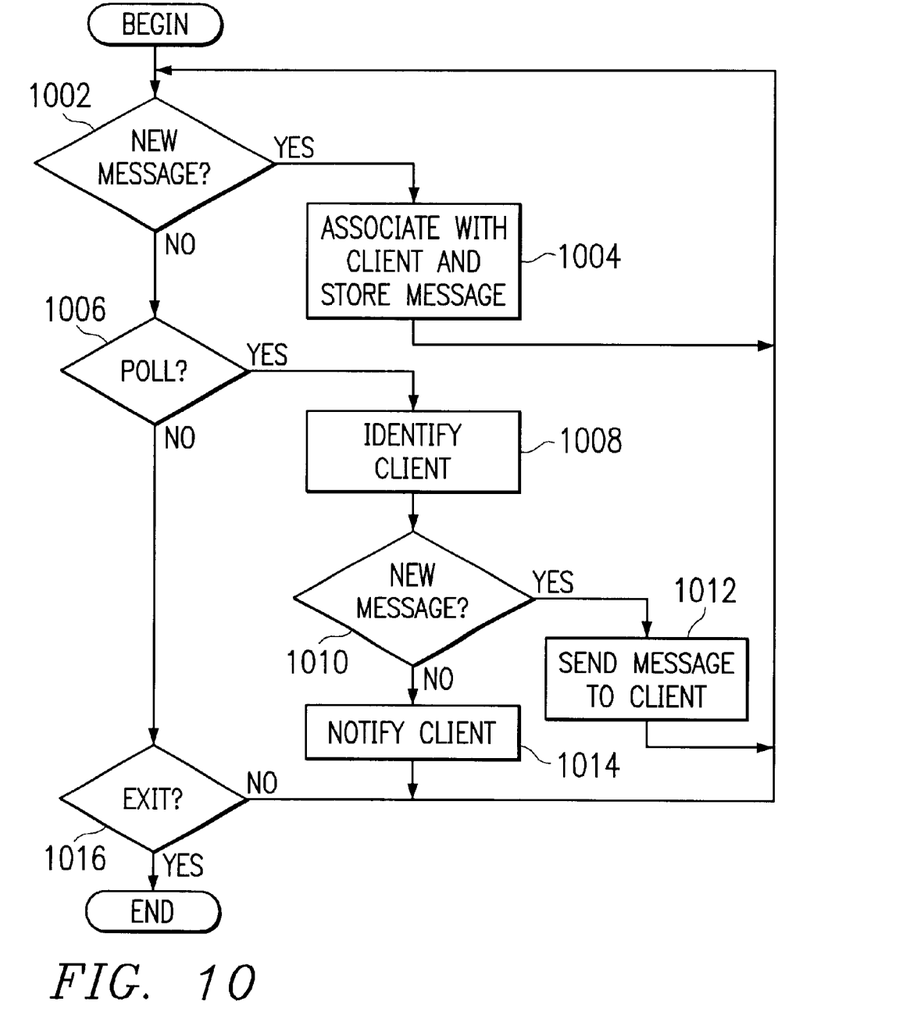
FIG. 10 is a flowchart illustrating the operation of a server in accordance with a preferred embodiment of the present invention.

Turning now to FIG. 10, a flowchart is shown illustrating the operation of a server in accordance with a preferred embodiment of the present invention. The process begins and a determination is made as to whether a new call status event message is received (step 1002). If a new message is received, the process saves the message in association with an appropriate client (step 1004) and returns to step 1002 to determine whether a new call status event message is received.

If a new call status event message is not received in step 1002, a determination is made as to whether the server is being polled by a client (step 1006). If the server is being polled by a client, the process identifies the client (step 1008) and a determination is made as to whether a new message exists for the client (step 1010). If a new message exists for the client, the process sends the message to the client (step 1012) and returns to step 1002 to determine whether a new call status event message is received. If a new message does not exist for the client in step 1010, the process notifies the client that there is no new call status event message (step 1014) and returns to step 1002 to determine whether a new call status event message is received.

If the server is not being polled by a client in step 1006, a determination is made as to whether an exit condition is detected (step 1016). An exit condition may be that the server is shut down or otherwise made inactive. If an exit condition is not detected, the process returns to step 1002 to determine whether a new message is received. If an exit condition is detected in step 1016, the process ends.

Thus, the present invention solves the disadvantages of the prior art by providing a telephone device with a customized display for displaying call connection status information. The telephone device detects call status events, such as ringing and busy signals, and presents the call status via the display. The telephone device also receives codes indicating particular call status events, such as "on hold" and "voice mail record mode." The present invention also provides telephones and other devices, such as answering machines and interactive voice response systems that generate call status codes or messages.

A telephone device may generate a code, which indicates that the user is hearing impaired. Thus, devices receiving this code may perform particular functions in response to such a code. For example, if an answering machine receives a code indicating that the caller is hearing impaired, the answering machine may skip the message, transmit a "recording" call status code, and record the caller's message. Public switches and public branch exchanges may also be modified to generate and deliver call status codes or messages. The present invention may also deliver call status information through another medium, such as a network. Thus, a caller may view call status information on a computer screen while attempting a telephone call.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, a CD-ROM, and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing call connection status information in a telephone device connected to a telephone network, comprising:
   receiving a call connection status code indicating status information regarding capabilities of an operator of a calling device participating in a communication session over the telephone network; and
   performing an action in response to the call connection status code, wherein the status information includes an indication that the caller is hearing impaired and wherein the step of performing an action comprises skipping an outgoing message.

2. A method for providing call connection status information in a telephone device connected to a telephone network, comprising:
   generating a first call connection status code indicating status information regarding capabilities of an operator of a calling device participating in a communication session over the telephone network;
   sending the call connection status code to a node in the telephone network; and
   sending the call connection status code to a server coupled between the telephone network and a computer network.

3. The method of claim 2, wherein the status information includes an indication that the caller is hearing impaired.

4. The method of claim 2, wherein the telephone device is one of a telephone, a mobile telephone, a call status monitoring device, a public switch, and a public branch exchange.

5. The method of claim 2, wherein the node comprises one of a local telephone device, a remote telephone device, a server computer, a public switch, and a public branch exchange.

6. A method for providing call connection status information in a telephone device connected to a telephone network, comprising:
   generating a first call connection status code indicating status information regarding a telephone device type of a calling device, wherein the status code indicates capabilities of an operator of the calling device;
   sending the call connection status code to a node in the telephone network; and
   sending the call connection status code to a server coupled between the telephone network and a computer network.

7. The method of claim 6, wherein the telephone device type is one of an interactive voice response system, a facsimile machine, and a modem.

8. The method of claim 6, wherein the telephone device is one of a telephone, a mobile telephone, a call status monitoring device, a public switch, and a public branch exchange.

9. The method of claim 6, wherein the node comprises one of a local telephone device, a remote telephone device, a server computer, a public switch, and a public branch exchange.

10. An apparatus for providing call connection status information in a telephone device connected to a telephone network, comprising:
    means for generating a first call connection status code indicating status information regarding capabilities of an operator of a calling device participating in a communication session over the telephone network;
    means for sending the call connection status code to a node in the telephone network; and
    sending the call connection status code to a server coupled between the telephone network and a computer network.

11. The apparatus of claim 10, wherein the status information includes an indication that the caller is hearing impaired.

12. The apparatus of claim 10, wherein the telephone device is one of a telephone, a mobile telephone, a call status monitoring device, a public switch, and a public branch exchange.

13. The apparatus of claim 10, wherein the node comprises one of a local telephone device, a remote telephone device, a server computer, a public switch, and a public branch exchange.

14. An apparatus for providing call connection status information in a telephone device connected to a telephone network, comprising:
    means for generating a first call connection status code indicating status information regarding a telephone device type of a calling device, wherein the status code indicates capabilities of an operator of the calling device;
    means for sending the call connection status code to a node in the telephone network; and
    sending the call connection status code to a server coupled between the telephone network and a computer network.

15. The apparatus of claim 14, wherein the telephone device type is one of an interactive voice response system, a facsimile machine, and a modem.

16. The apparatus of claim 14, wherein the telephone device is one of a telephone, a mobile telephone, a call status monitoring device, a public switch, and a public branch exchange.

17. The apparatus of claim 14, wherein the node comprises one of a local telephone device, a remote telephone device, a server computer, a public switch, and a public branch exchange.

18. A telephone system, comprising:

a telephone device;

a server computer connected to the telephone device, wherein the server computer receives a call connection status code from the telephone device and stores the received call connection status code; and a client computer connected to the server computer, wherein the client computer receives the call connection status code from the server computer and presents a call connection status message corresponding to the call connection status code.

19. A telephone system, comprising:

a telephone device;

a server computer connected to the telephone device, wherein the server computer receives a call connection status code from the telephone device, generates a call connection status message corresponding to the call connection status code, and stores the received call connection status message; and a client computer connected to the server computer, wherein the client computer receives the call connection status message from the server computer and presents the received call connection status message.

20. A computer program product, in a computer readable medium, for providing call connection status information in a telephone device connected to a telephone network, comprising:

instructions for receiving a call connection status code indicating status information regarding capabilities of an operator of a calling device participating in a communication session over the telephone network; and instructions for performing an action in response to the call connection status code, wherein the status information includes an indication that the caller is hearing impaired and wherein the step of performing an action comprises skipping an outgoing message.

21. A computer program product, in a computer readable medium, for providing call connection status information in a telephone device connected to a telephone network, comprising:

instructions for generating a first call connection status code indicating status information regarding capabilities of an operator of a calling device participating in a communication session over the telephone network;

instructions for sending the call connection status code to a node in the telephone network; and instructions for sending the call connection status code to a server coupled between the telephone network and a computer network.

* * * * *

UNITED STATES PATENT AND TRADEMARK OFFICE
CERTIFICATE OF CORRECTION

PATENT NO. : 6,665,375 B1
DATED : December 16, 2003
INVENTOR(S) : Forlenza et al.

It is certified that error appears in the above-identified patent and that said Letters Patent is hereby corrected as shown below:

Title page,
Item [75], Inventors, delete "James Newton Smith, Jr." and insert -- Newton James Smith, Jr. --.

Signed and Sealed this

Tenth Day of January, 2006

JON W. DUDAS
*Director of the United States Patent and Trademark Office*